(12) United States Patent
Arza (10) Patent No.: US 10,744,387 B2
(45) Date of Patent: Aug. 18, 2020

(54) FOOTBALL TRAINING DEVICE

(71) Applicant: B-GREAT GROUP, LLC, Miami, FL (US)

(72) Inventor: Edward Arza, Miami, FL (US)

(73) Assignee: Edward Arza, Tallahassee, FL (US)

( * ) Notice: Subject to any disclaimer, the term of this patent is extended or adjusted under 35 U.S.C. 154(b) by 473 days.

(21) Appl. No.: 14/274,157

(22) Filed: May 9, 2014

(65) Prior Publication Data

US 2015/0321064 A1 Nov. 12, 2015

(51) Int. Cl.
| | | |
|---|---|---|
| *A63B 69/00* | (2006.01) | |
| *A63B 21/00* | (2006.01) | |
| *A63B 21/065* | (2006.01) | |
| *G09B 19/00* | (2006.01) | |
| *A63B 71/06* | (2006.01) | |
| *A63B 21/06* | (2006.01) | |

(52) U.S. Cl.
CPC ........ *A63B 69/0059* (2013.01); *A63B 21/065* (2013.01); *A63B 21/4007* (2015.10); *A63B 69/002* (2013.01); *G09B 19/0038* (2013.01); *A63B 21/00065* (2013.01); *A63B 21/0603* (2013.01); *A63B 21/0604* (2013.01); *A63B 21/4005* (2015.10); *A63B 71/0622* (2013.01); *A63B 2071/0627* (2013.01); *A63B 2071/0655* (2013.01); *A63B 2207/02* (2013.01); *A63B 2209/10* (2013.01); *A63B 2210/50* (2013.01); *A63B 2225/09* (2013.01); *A63B 2225/50* (2013.01); *A63B 2243/007* (2013.01)

(58) Field of Classification Search
CPC .... A63B 2069/0004; A63B 2069/0006; A63B 2243/007; A63B 69/002
USPC .......... 473/438, 458, 422, 464, 59, 207–208
See application file for complete search history.

(56) References Cited

U.S. PATENT DOCUMENTS

| | | | | |
|---|---|---|---|---|
| 5,324,038 | A * | 6/1994 | Sasser ........................ | 473/212 |
| 8,740,730 | B1* | 6/2014 | Przyborowski ............... | 473/438 |
| 8,986,139 | B1* | 3/2015 | Gideon ........................ | 473/438 |
| 2008/0026351 | A1* | 1/2008 | Thompson ............. | A63B 69/00 434/251 |
| 2010/0323824 | A1* | 12/2010 | Gamboa ................ | A63B 69/00 473/438 |

* cited by examiner

*Primary Examiner* — John E Simms, Jr.
*Assistant Examiner* — Rayshun K Peng
(74) *Attorney, Agent, or Firm* — Leudeka Neely Group, PC (57) ABSTRACT

A football training device for teaching a user the proper throwing mechanics to obtain optimal football ball release timing, as well as the correct takeaway motion of a quarterback or any other person, wherein the present invention assists, and when necessary corrects, the user in taking a football from an unloaded football position to a loaded football position.

20 Claims, 13 Drawing Sheets

FOOTBALL TRAINING DEVICE

FIELD OF THE INVENTION

The present invention relates to a football training device, and more in particularly to a football training device for teaching a user the proper football throwing mechanics to obtain optimal football ball release timing.

BACKGROUND OF THE INVENTION

In order to complete a well performed football pass, a quarterback should have the optimal throwing motion, which includes body position and takeaway position. In particular, it is desirable for a quarterback to complete a pass with an erect posture. It is further desirable for the quarterback to transition the ball from a neutral position to a loaded position with the tip of the ball raised above the quarterback's elbow because lowering of the football during the takeaway is a common cause of fumbles and a slow football release.

However, there exists no known device with a corrective member configured to prevent the downward takeaway of the football to the loaded position.

SUMMARY OF THE INVENTION

The present invention advantageously provides a football training device for teaching a user the proper throwing mechanics to obtain optimal football ball release timing, as well as the correct takeaway motion of a quarterback or any other person.

According to an embodiment of the present invention, a principal object is to provide a vest worn by a user for improving a quarterback's throwing mechanics, including increasing the release time of the football leaving the quarterback's hand and eliminating unnecessary movements that slow down the release time of the ball being through and leaving the quarterbacks hand.

According to an embodiment of the present invention, another object is to alert a quarterback and/or the quarterback's coach when the quarterback contacts a corrective member, the corrective member positioned to be contacted when the quarterback lowers the ball during the transition to a loaded football position. The loaded football position allows the quarterback to uncoil and deliver a football pass.

According to an embodiment of the present invention, another object is to disclose a football training device comprising a wearable member forming a front portion and a back portion and a corrective member affixed to the wearable member.

In an embodiment, the corrective member extends outwardly from the front portion.

In yet another embodiment, the corrective member releasably affixing to the wearable member.

In yet a further embodiment, the corrective member releases from the wearable member from a user caused contact.

In an embodiment of the invention, is at least one front portion hook and loop material integrating with front portion, a corrective member hook and loop material integrating with a proximal end of the corrective member, the corrective member hook and loop material releasably affixed with the at least one front portion hook and loop mating.

In a yet further embodiment, a front portion hook and loop material including a first vertical portion and a second vertical portion, the first and second vertical portion each extending vertically along the front portion. The first and second vertical portion converging towards a bottom of the front portion. In yet another embodiment, the first and second vertical portion diverging towards a bottom of the front portion.

In an embodiment of the invention, at least one member is capable of providing any of a visual and/or an audial alert following a contact with the corrective member.

In yet another embodiment, a signal transmission apparatus configured to transmit a signal to a remote device for alerting of at least one contact with the corrective member.

According to an embodiment of the present invention, a principal object is to provide a football training device for improving the ball takeaway of a quarterback to a loaded football ball position, the football training device comprising a wearable member having a front portion and a corrective member having a proximal portion releasably affixable to the front portion. The corrective member having an outwardly extending portion.

In an embodiment, the corrective member extending outwardly at substantially a right angle to the front portion.

In an embodiment, the corrective member extending outwardly substantially perpendicular to the front portion.

In yet another embodiment, the corrective member extending outwardly at least substantially parallel to a side of the wearable member.

In an embodiment, the corrective member extending outwardly from the proximal portion at least substantially parallel to a side of the wearable member.

In an embodiment, the corrective member extending outwardly between the sides of the wearable portion of the football training device.

According to an embodiment of the present invention, a principal object is to provide a football training device for improving the ball takeaway of a quarterback to a loaded football ball position, the football training device comprising a wearable member, at least one corrective member releasably affixed to the wearable member, whereby the at least one corrective member positioned for receiving contact during a quarterback football transition having a low football takeaway to the loaded football position.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides a football training device for teaching a user the proper throwing mechanics to obtain optimal football ball release timing, as well as the correct takeaway motion of a quarterback or any other person. The present invention contemplates various types of football training device, including vests and shoulder pads having a member for correcting both the football takeaway to the loaded position.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
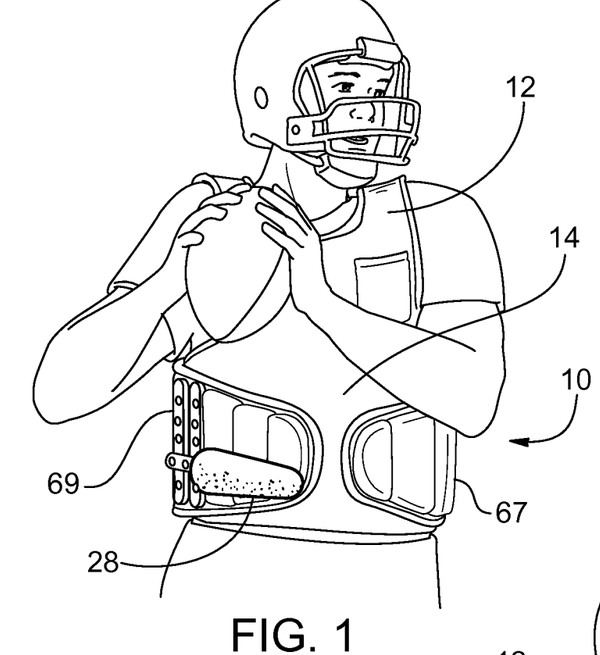
FIG. 1 is a perspective view of a football training device in accordance with the principles of the present embodiment.

Referring now to the drawings figures in which like reference designators refer to like elements. FIG. 1 shows an exemplary football training device constructed in accordance with the principles of the present invention and designated generally as football training device "10." In particular, the football training device 10 may be formed having a wearable portion 12, the wearable portion 12 having a front portion 14 and a back portion 16 (see FIG. 3) constructed to form a vest. The front and back portions 14, 16 optionally including sides 15, 17 (see FIG. 3). The front portion 14 including a left edge 67 and a right edge 68.

Figure 2:
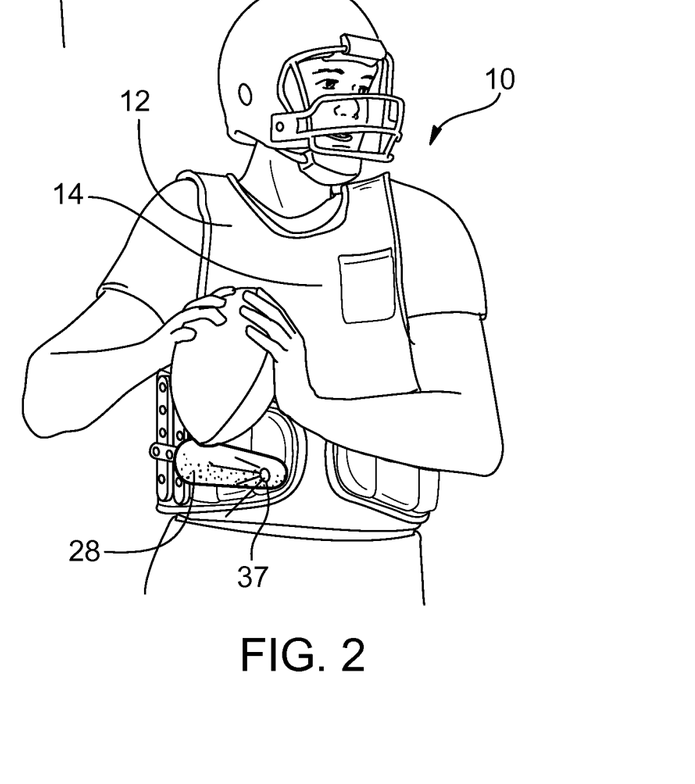
FIG. 2 is a perspective view of a football training device depicting contact with a corrective member in accordance with the principles of the present embodiment.

In the embodiments shown in FIGS. 1-2, the wearable portion 12 is worn by a quarterback. While the instant invention references use by a quarterback, a quarterback includes any person that may use the device or any user whatsoever within the spirit and scope of the present invention.

Figure 3:
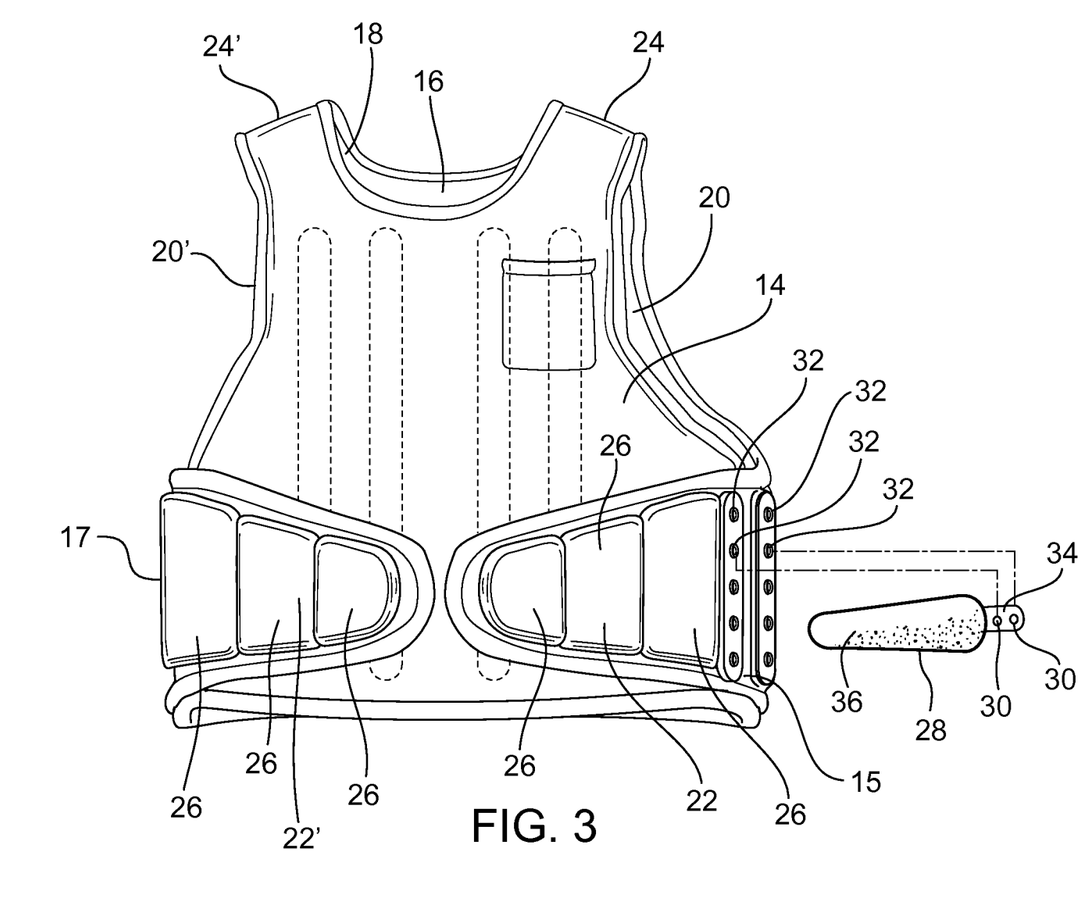
FIG. 3 is a partially exploded view of a corrective member of the football training device of FIG. 1 in accordance with the principles of the present embodiment.

Referring now to FIG. 3, the front portion 14 and the back portion 16 join to form a neck opening 18 for the quarterbacks neck to enter and mirrored left and right arm openings 20, 20'. In one embodiment, the wearable portion sits on a quarterback's shoulders for maintaining the wearable portion 12 (see FIG. 1-2). In an embodiment, the wearable portion 12 includes left and right flaps 22, 22'. The left and right flaps 22, 22' releasably secure with front portion 14 to provide an adjustable and secure fit of the vest with the quarterback. In an embodiment, the left and right flaps 22, 22' secure to the front portion 14 by way of intervening hook and loop material (not shown). While hook and loop material is disclosed, alternative securement members may be implemented within departing from the spirit and scope of the present embodiment.

Figure 10:
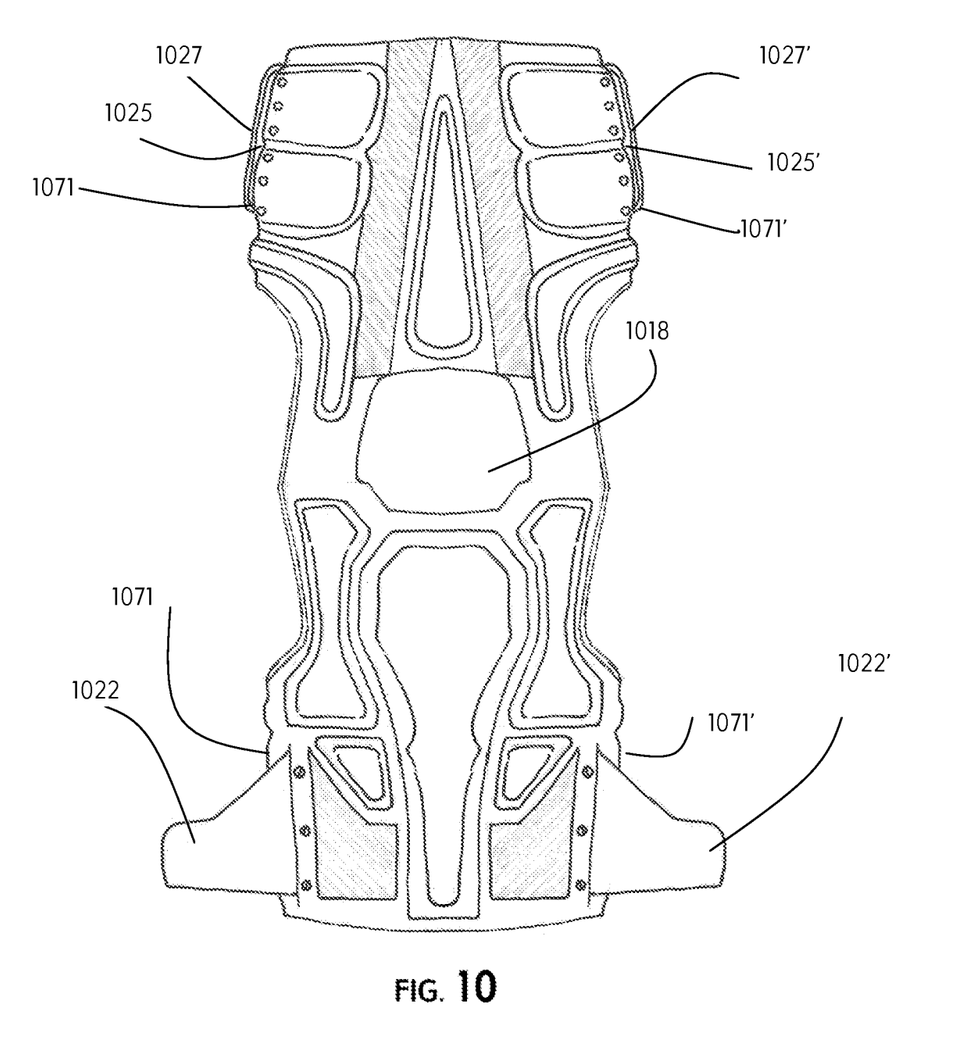
FIG. 10 is an embodiment of the football training device of FIGS. 8 & 9 in an open state in accordance with the principles of the present invention.
Figure 11:
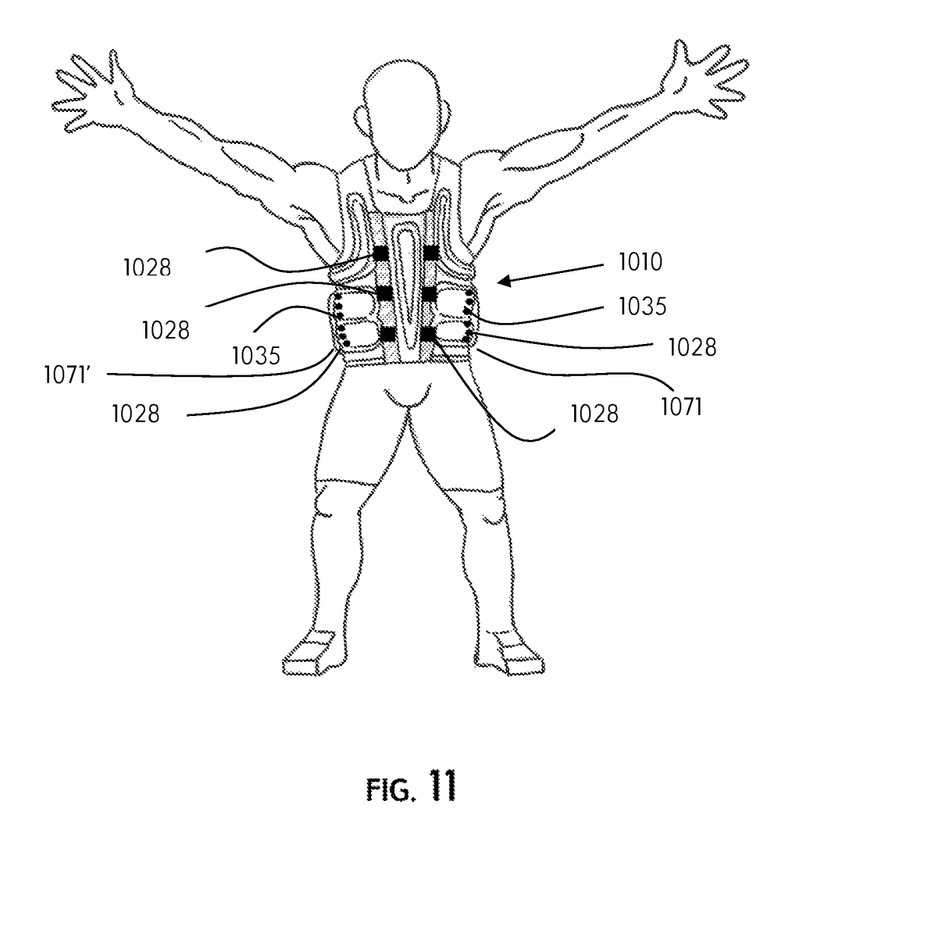
FIG. 11 is a front view of the football training device of FIGS. 8-10 being worn by a quarterback in accordance with the principles of the present embodiment.
Figure 12:
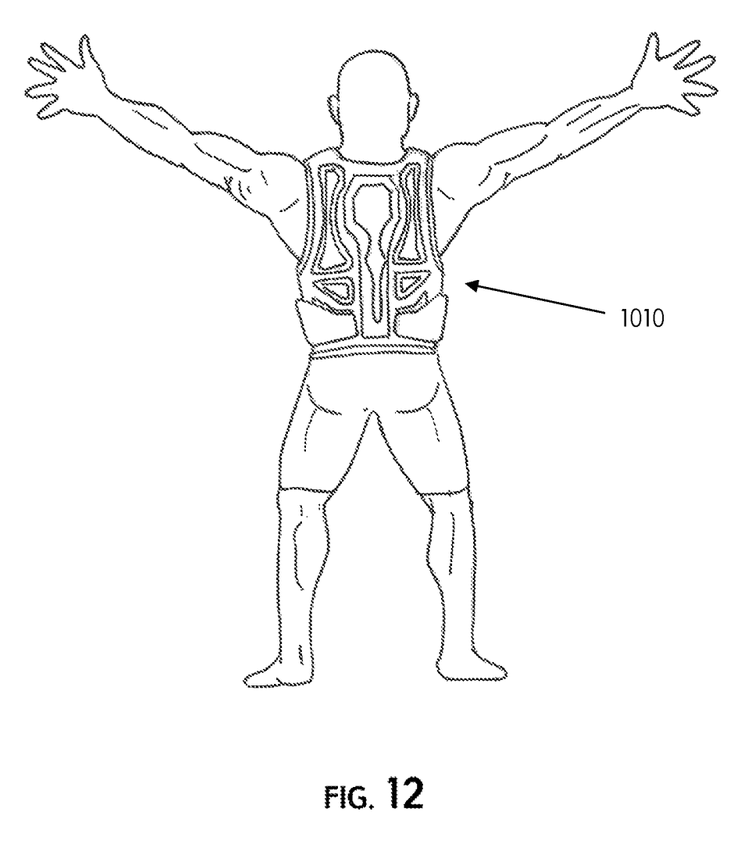
FIG. 12 is a rear view of the football training device of FIGS. 8-10 being worn by a quarterback in accordance with the principles of the present embodiment.
Figure 13:
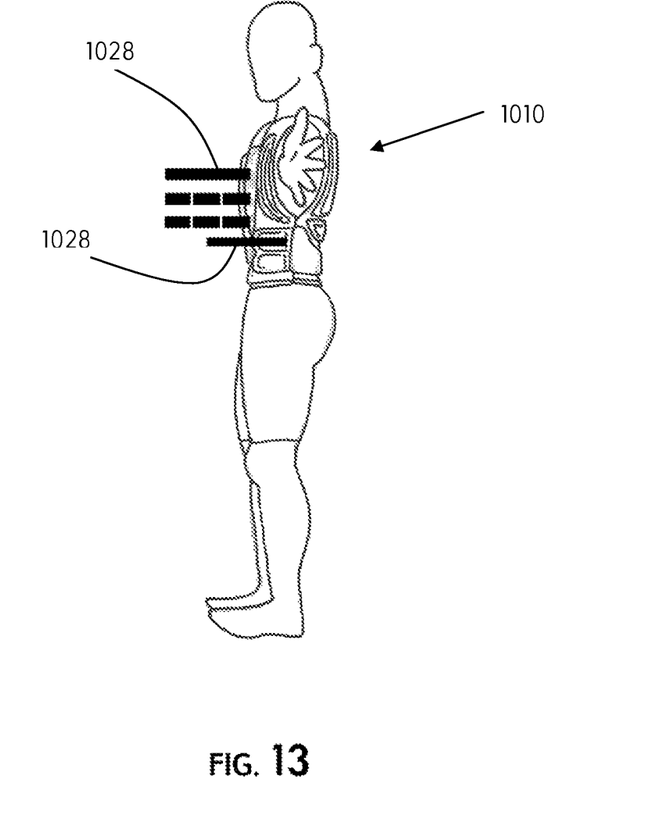
FIG. 13 is a left side view of the football training device of FIGS. 8-10 being worn by a quarterback in accordance with the principles of the present embodiment.
Figure 14:
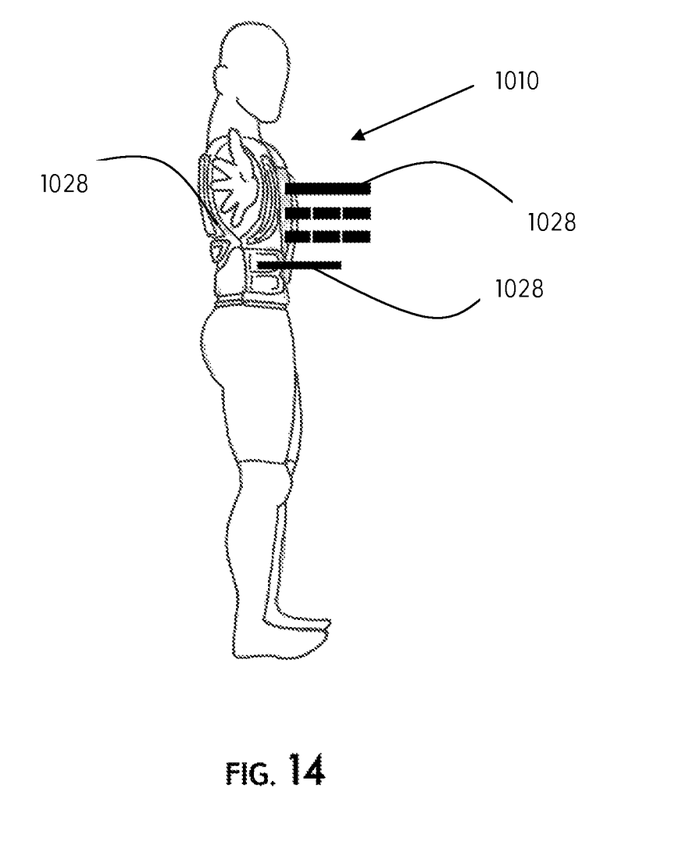
FIG. 14 is a right side view of the football training device of FIGS. 8-10 being worn by a quarterback in accordance with the principles of the present embodiment
Figure 15:
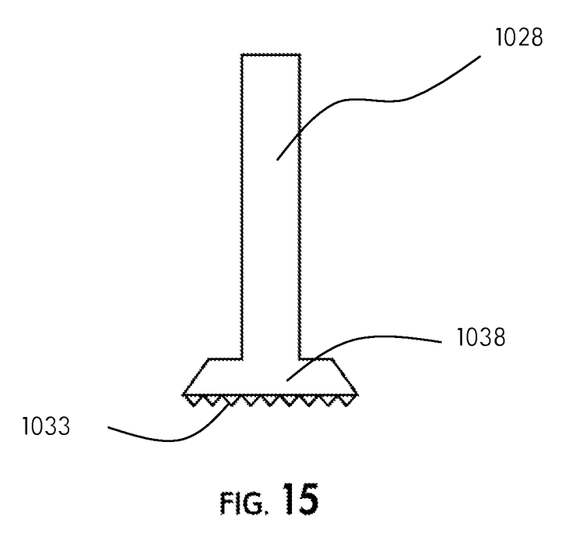
FIG. 15 is a view of an exemplary corrective member in accordance with the principles of the present embodiment.

In an embodiment, when the left and/or right flap 22, 22' release from the front portion 14, the front portion 14 and the back portion 16 may be joined only at or near a left and right shoulder seam 24, 24' (similar to the embodiment of FIG. 10).

The inside (not shown) of the left and right flap 22, 22' optionally include pockets for supporting one or more weighted members 26 for providing resistance to a quarterback. The weights may be composed of any suitable material, such as steel pellets, metal grains or sands, or the like. While the weights of the instant embodiment are disclosed as integrating with the left and right flaps 22, 22', it is not so required; instead, weights may be integrated with the football training device 10 at any desired location of the wearable portion 12.

The football training device 10 including a corrective member 28. In an embodiment, the corrective member 28 is removably attached or otherwise affixed, either directly or indirectly, to the wearable portion 12.

In the embodiment shown in FIGS. 1-4, the corrective member 28 formed of an elongated portion 34. The elongated portion 34 may be completely or partially surrounded by soft material, such as foam or other like materials. In one embodiment, the corrective member 28 secures along the side of the football training device 10 extending outwardly in substantially the z direction as related to the front portion 14.

In an embodiment, the corrective member extending outwardly from the front portion 14 and extending substantially between the left and right edges 67, 69.

In one operational embodiment, the outward extension of the corrective member 28 correlates to the quarterback such that the corrective member 28 extends in front of the quarterback/football training device thereof, and not out towards the side of the quarterback/football training device.

Still referring to FIGS. 1-4, a securement assembly 31 is shown. In one embodiment, the securement assembly 31 including the reciprocating press snap buttons. While securement assembly 31 is shown having press snap buttons, hook and loop material, screws and/or bolts, or other like securement members may be substituted within the spirit and scope of the instant embodiment.

Still referring to the embodiment shown in FIGS. 1-4, the corrective member 28 having one or more press snap buttons 30. The one or more press snap buttons secure to the wearable portion 12 via reciprocating press snap button receiving portions 32. While the instant embodiment depicts press snap buttons, other securement members for releasably securing corrective member 28 to the wearable portion 12 are contemplated and within the spirit and scope of the present invention.

In an embodiment, the elongated portion 34 is bendable allowing for deformation when contact to the corrective member is caused by the quarterback. The elongated portion 34 is configured to resume its original shape when force caused to be received by the quarterback is removed therefrom.

Still referring to the embodiment shown in FIGS. 1-4, the corrective member 28 affixed at proximal end 38 to the wearable portion 12 and extending outwardly from the wearable portion 12 and in relation to the front of quarterback's torso. In operation, the corrective member 28 extends outwardly from the front portion 14. The corrective member 28 is configured to receive contact from a quarterback when the quarterback transitions from a neutral position (see FIG. 1 depicting a quarterback in a neutral position; see FIG. 2 depicting a quarterback causing a ball to contact the corrective member 28 when transitioning to a loaded position).

Figure 4:
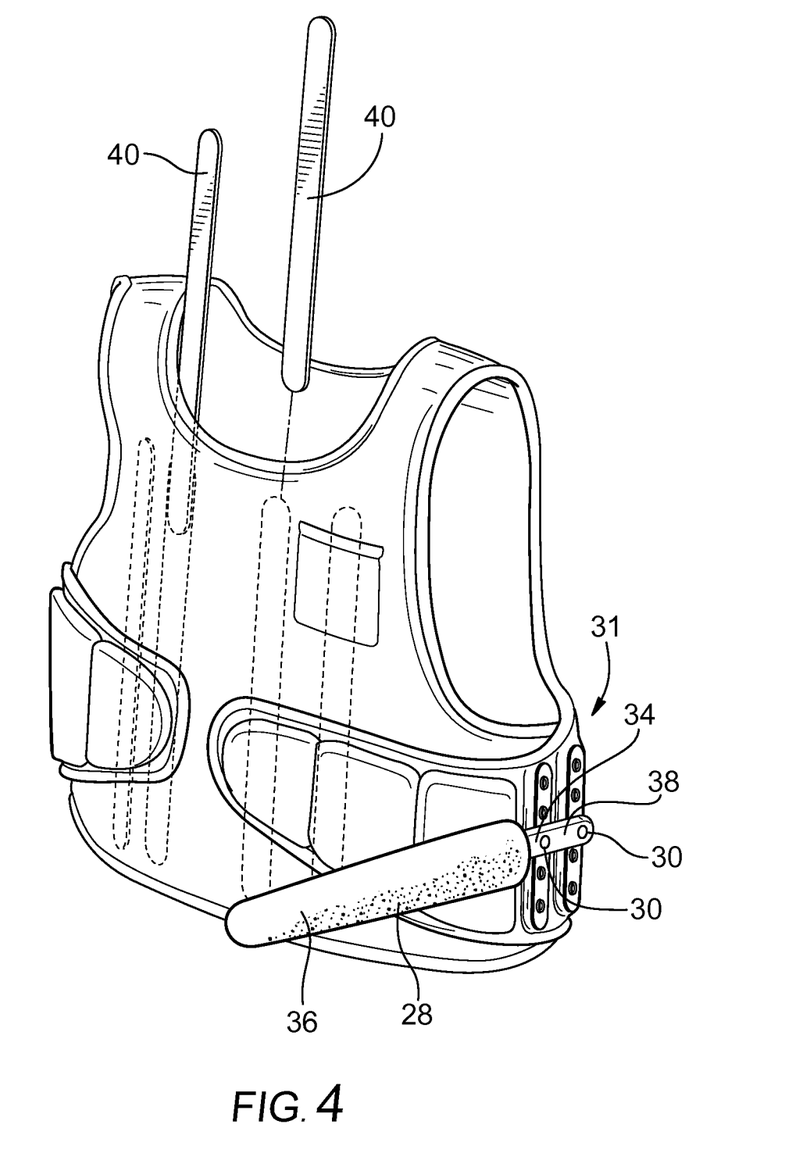
FIG. 4 is an embodiment of a football training device having an exploded view of a corrective posture member in accordance with the principles of the present embodiment.

Referring now to FIG. 4, posture corrective members 40 are shown. The elongated posture corrective members 40 are secured with the football training device 10 for maintaining and/or correcting the posture of a quarterback.

In an embodiment, the football training device 10 may include one or more audial or visual alert members 37 coupled thereof for alerting to contact with the corrective member 28, including without limitation contact caused by the quarterback. The audial or visual alert members 37 may include emitting light and/or sound from the football training device to alert the quarterback and/or the quarterback's coach to contact with the corrective member 28.

The football training device 10 includes a corrective member 28. In an embodiment, the corrective member 28 is formed having an elongated body 34 releasably secured on a proximal end 38 to the wearable portion 12.

Figure 5:
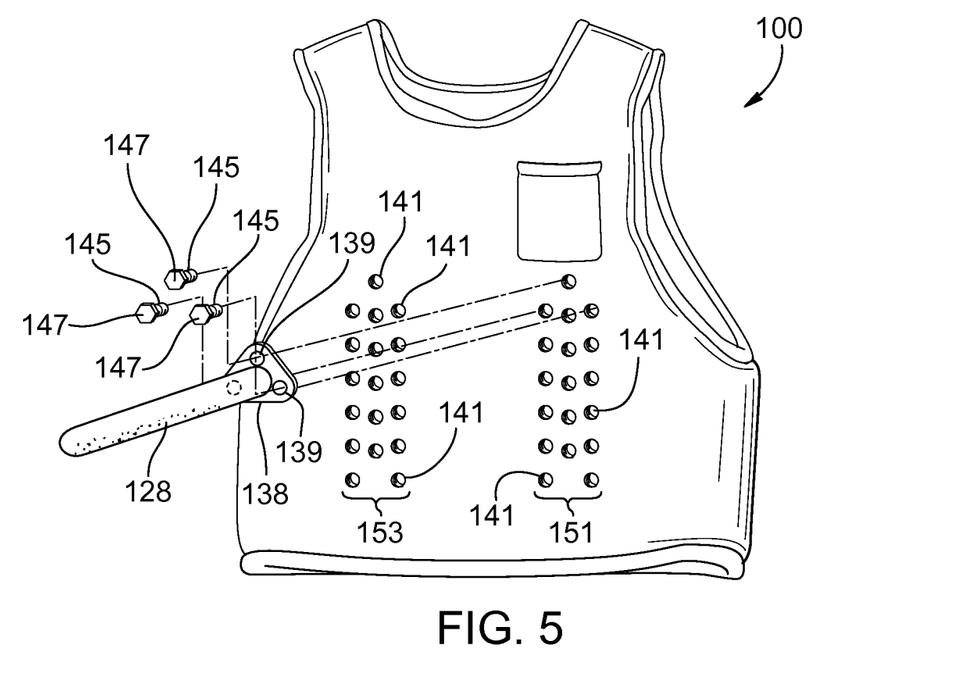
FIG. 5 is an embodiment of a football training device having a corrective member releasably securable to the device thereof in accordance with the principles of the present embodiment.

Referring now to the embodiment shown in FIG. 5, a vest 100 having a plurality of threaded apertures 141. A corrective member 128 having a proximal end 138. The proximal end 138 having a plurality of apertures 139, which may or may not be threaded. A plurality of securement members having head 147 and a threaded portion 145. The threaded portion 145 being received into the plurality of apertures 139, 141, for securing the corrective member 128 to the vest 100. The vest 100 having a plurality of apertures for selectively choosing and/or adjusting the level of the corrective member 128. The vest 100 having a set of left apertures 151 for a left handed quarterback and a set of right apertures 153 for a right handed quarterback.

Figure 6:
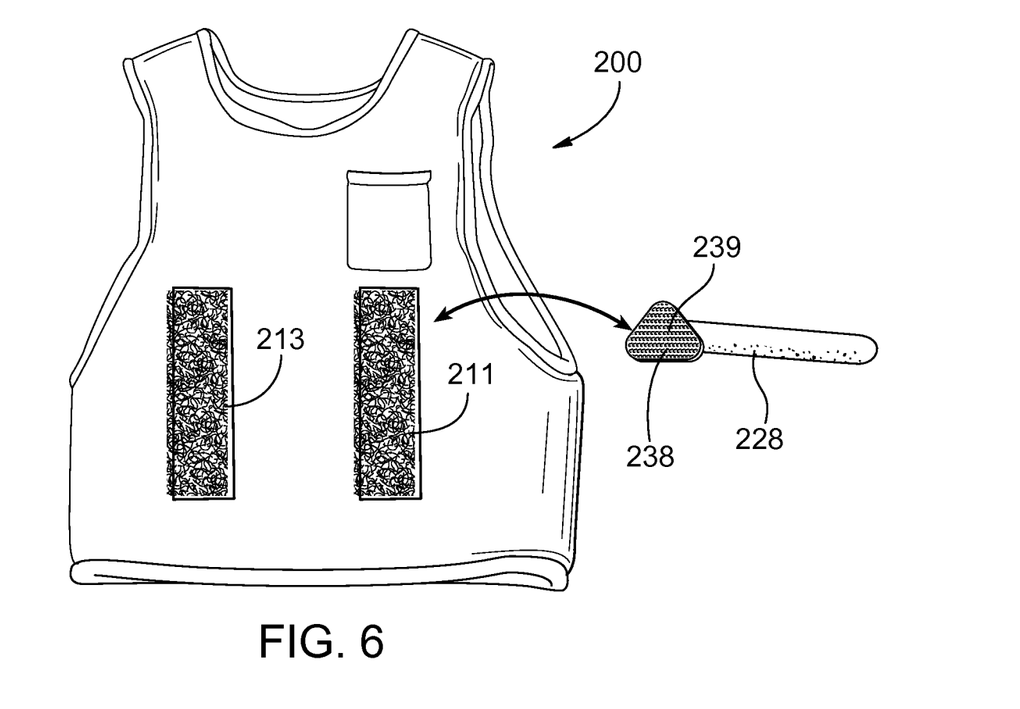
FIG. 6 is an embodiment of a football training device having a corrective member releasably securable to the device via hook and loop material in accordance with the principles of the present embodiment.

Referring now to the embodiment shown in FIG. 6, a vest 200 having a first hook and loop material 211 and a second hook and loop material 213, configured for use for either of a left handed quarterback or a right handed quarterback. Each of the first and second hook and loop material 211, 213 extending vertically along the vest 200. A corrective member 228 having a proximal end 238. The proximal end 238 having hook and loop material 239 that reciprocates with the hook and loop material 211, 213.

In an embodiment, a signal transmission apparatus (not shown) is coupled with the football training device to transmit a signal from the signal transmission apparatus to a remote device, such as a smart phone, tablet, or other electronic device, for alerting of at least one contact with the corrective member. A mobile application, or other software, may be included and stored in computer readable memory, for viewing and statistically analyzing a plurality of quarterback throws over a period of time.

In embodiments shown in FIG. 5-6, the wearable portion does not include left and right flaps 22, 22', and instead is slipped over the arms and neck of a quarterback, similar to a typical clothing. The front portion 14 and the back portion 16 are joined along a side seam (not shown), as commonly understood in the art.

Figure 7:
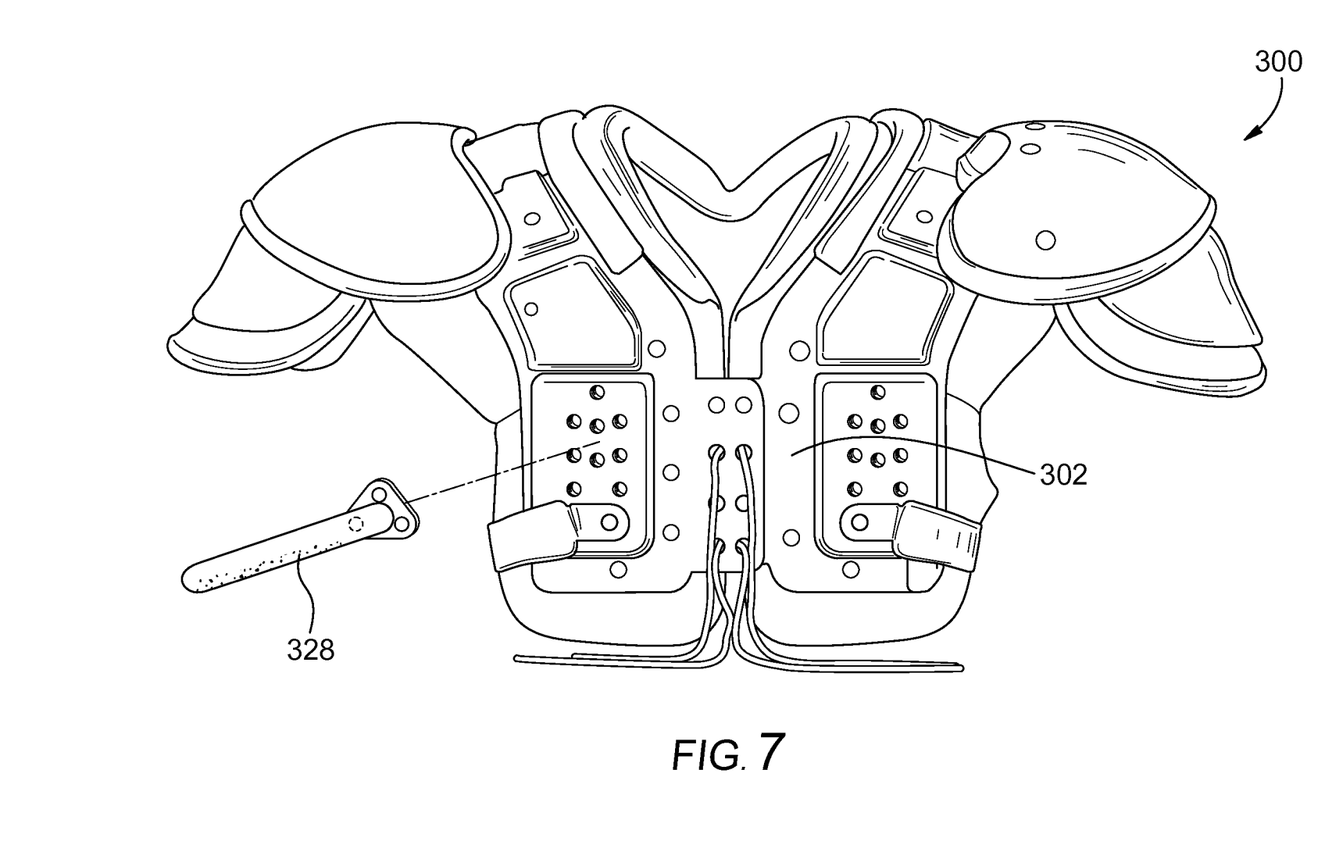
FIG. 7 is an embodiment having a corrective member attached to football shoulder pads in accordance with the principles of the present embodiment.

Referring now to an embodiment shown in FIG. 7, a football shoulder pads 300 is shown having a front portion 302. The front portion removably receiving a corrective member 328. The corrective member 328 removably affixed with the shoulder pads 300 via a securement member within the spirit and scope of the instant invention. The corrective member 328 extending out from the shoulder pads 300 substantially perpendicular to the shoulder pads 300. The corrective member 328 may optionally extend through an aperture in a jersey (not shown) that covers the shoulder pads 300. The corrective member 328 for teaching a quarterback the proper transition from a neutral position to a loaded ball position before release of the football during a football pass without dropping the down causing a long windup and presenting the opportunity for a football defender to strip the football from the quarterback.

Referring now to FIGS. 8-15, football training device 1010 having a wearable portion 1012, the wearable portion 1012 having the front portion 1014 and the back portion 1016 join to form a neck opening 1018 and mirrored left and right arm openings 1020, 1020'. In an embodiment, the wearable portion 1012 includes left and right flaps 1022, 1022' having hook and loop material thereof (not shown). The left and right flaps 1022, 1022' releasably secure on its hook and loop material with back portion 1016 via hook and loop material 1023, 1023' that reciprocates having a portion of the hook and loop material integrated with the back portion 1016 to provide an adjustable and secure fit of the vest with the quarterback. In an embodiment, the left and right flaps 1022, 1022' secure to the back portion 1014 by way of inserting the flaps 1022, 1022' through apertures 1025, 1025' created by members 1027, 1027', folding the flaps 1022, 1022' over and around the members 1027, 1027' and securing the flaps 1022, 1022' against the hook and loop material at elements 1023, 1023'. While hook and loop material is disclosed, alternative securement members may be implemented within departing from the spirit and scope of the present embodiment. Members 1027, 1027' secured along the sides 1071, 1071' of the wearable portion 1012.

One or more hook and loop portions 1031, 1031' are integrated with the front portion 1014 for receiving a corrective member 1028. The corrective member 1028 having hook and loop material 1033 at a proximal portion for reciprocal affixing against any of elements 1031, 1031', 1035, 1035'. In the embodiment shown in FIG. 8, the hook and loop material 1031, 1031' extends vertically and at an angle along the front portion 1014 of the football training device 1010, converging towards the bottom portion thereof.

Figure 8:
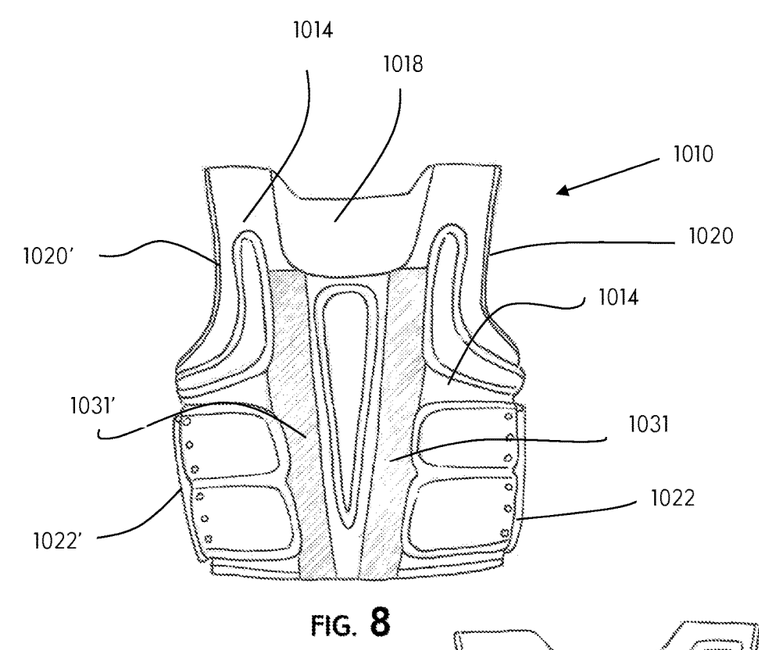
FIG. 8 is an embodiment of a front view of a football training vest in accordance with the principles of the present invention.
Figure 9:
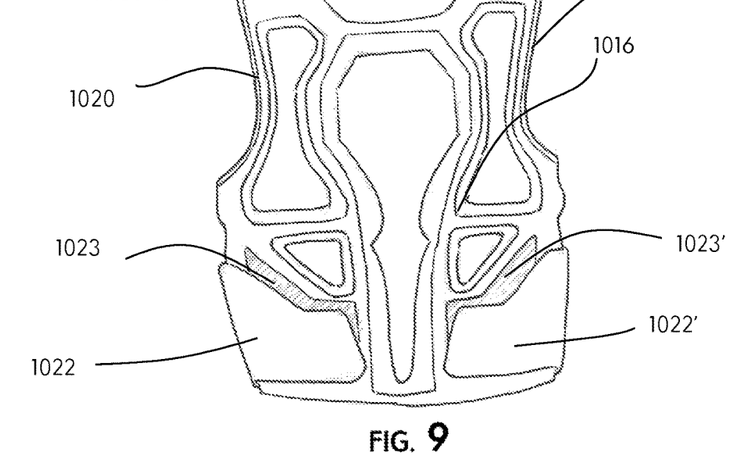
FIG. 9 is an embodiment of a rear view of a football training view in accordance with the principles of the present invention.

The corrective member 1028 may be removably affixed at different levels along the front portion 1014. In addition to the reciprocating hook and loop material 1031, 1031', 1035, 1035', reciprocating hook and loop material may be placed at any point about the front portion 1014 for receiving the corrective member 1028. Other attachment members may be optionally implemented and placed at any point about the front portion 1014 for receiving the corrective member 1028.

In an embodiment, the one or more corrective members 1028 may be secured along hook and loop material along element 1031, 1031' or may be secured at portions at or near the side of the front portion 1014. In one embodiment, one, two, or more corrective members 1028 are removably affixed on the side of the front portion 1014 that relates to the throwing hand of the quarterback (being either left or right handed) for alerting the quarterback that their hand drops during the transition from a neutral position to a loaded football position.

The corrective member 1028 formed of an elongated portion for extending from the front portion 1014 and away from the quarterbacks front side of his body.

In an embodiment, the corrective member 1028 is bendable allowing for deformation when contacted is caused by the quarterback. The elongated portion 1034 is configured to resume its original shape when force caused to be received by the quarterback is removed therefrom.

In an embodiment, the corrective member 1028 releases from the football training device 1010 when the quarterback causes contact with the corrective member 1028. In operation, when the corrective member 1028 receives a force, the corrective member 1028 will release and fall to the ground, requiring the quarterback, or any other person, to pick up the corrective member 1028 and replace the corrective member 1028 by re-affixing the corrective member 1028 to the front portion 1014.

Still referring to the embodiment shown in FIGS. 8-15, the corrective member 1028 affixed at proximal end 1038 to the wearable portion 1012 and extending outwardly from the wearable portion 1012 and in of the corrective member 1028 and of the quarterback's torso. In operation, the corrective member 1028 extends outwardly from the front portion 1014. The corrective member 1028 is configured to receive contact from a quarterback when the quarterback transitions from a neutral position to a loaded position.

Figures 16, 17:
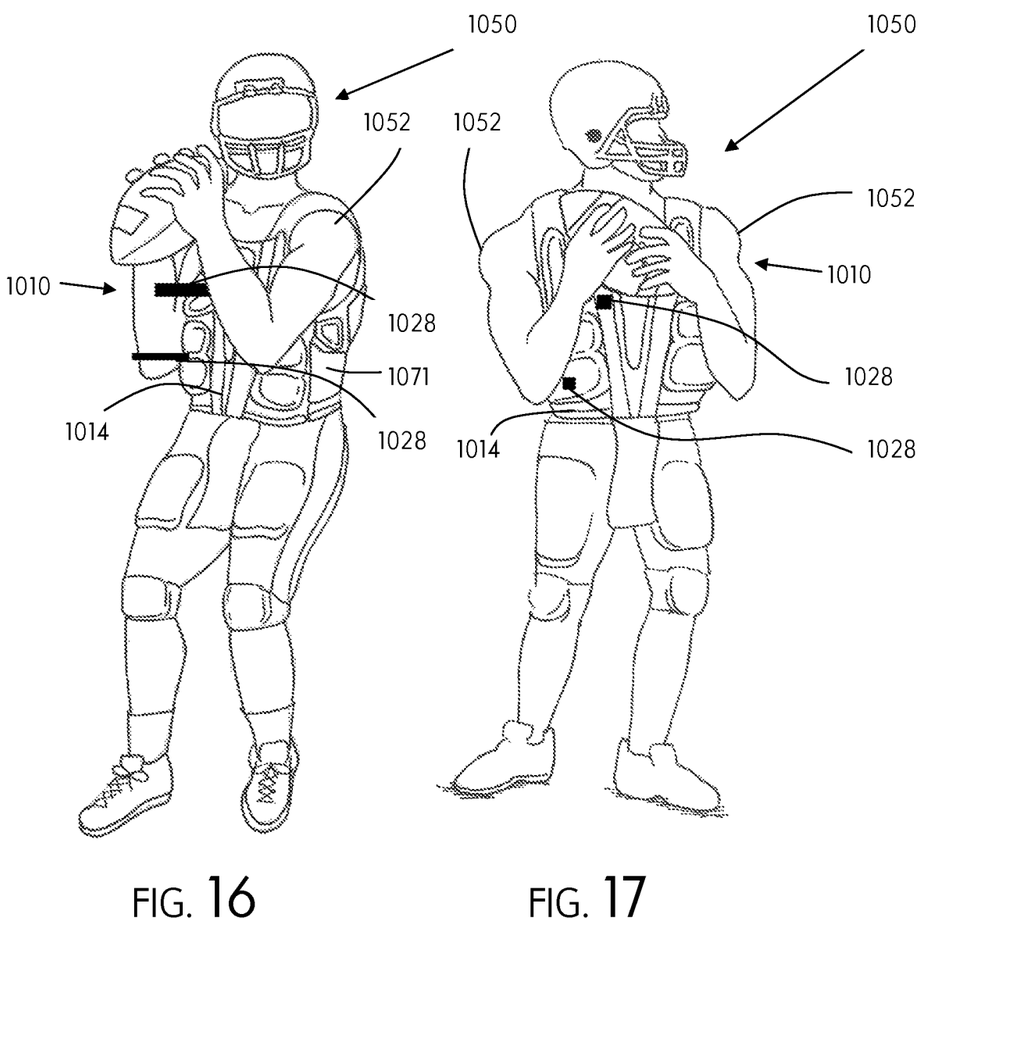
FIG. 16 is a perspective view of the football training device of FIGS. 8-10 in use by a quarterback in accordance with the principles of the present embodiment.
FIG. 17 is an alternative perspective view of the football training device of FIGS. 8-10 in accordance with the principles of the present embodiment.

Referring now to FIGS. 16-17, a quarterback 1050 is shown wearing the football training device 1010. The quarterback having left and right shoulders 1052 as is commonly understood. The corrective member 1028 extending outwardly from the wearable portion 1012 between the shoulders 1052 of the quarterback 1050. In operation, the corrective members extend outwardly to allow the quarterback to hold the football in a neutral position with the throwing elbow (FIGS. 16-17 depicting a right handed quarterback; the invention may be implemented for right and/or left handed quarterbacks) at or near the quarterback's side. Furthermore, the corrective members 1028 are positioned between the elbows of the quarterback so as to not affect the proper and natural throwing motion thereof. The position of the corrective member(s) 1028 should not impede or otherwise affect the throwing motion of the quarterback.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure. Various elements from the various embodiments disclosed herein may be combined together to arrive at the present invention.

What is claimed is:

1. A football training device comprising:
a wearable vest having a breast plate; and
a deformable corrective member, the deformable corrective member consisting essentially of an elongate tubular-shaped member having a proximal end and a distal end, the proximal end being attached only to breast plate and the elongate tubular-shaped member extending outwardly substantially perpendicular to the breast plate of the vest, wherein the elongate tubular-shaped member is positioned on the breast plate on a side of the breast plate that relates to the throwing hand of a user and is positioned at a height on the breast plate that alerts a user of a low football takeaway from a neutral position to a loaded football ball position.

2. The football training device of claim 1, wherein the proximal end of the elongate tubular-shaped member is releasably attached to the breast plate of the vest.

3. The football training device of claim 2, wherein the elongate tubular-shaped member is configured to release from the breast plate upon contact of the elongate tubular-shaped member with an arm of a user.

4. The football training device of claim 2, further comprising one or more breast plate hook and loop material(s) integrated with the breast plate of the vest, and corrective member hook and loop material integrated with the proximal end of the elongate tubular-shaped member, wherein the corrective member hook and loop material is releasably affixed to at least one of the one or more breast plate hook and loop material(s).

5. The football training device of claim 4, wherein the breast plate of the vest comprises multiple breast plate hook and loop materials, and wherein the elongate tubular-shaped member is repositionable on the breast plate hook and loop materials.

6. The football training device of claim 4, wherein the one or more breast plate hook and loop materials comprise an elongate substantially vertical strip of hook and loop material on a right half of the breast plate of the vest and an elongate substantially vertical strip of hook and loop material on a left half of the breast portion of the vest.

7. The football training device of claim 1, wherein the elongate tubular-shaped member further comprises at least one device configured to provide at least one of a visual and an audial alert upon contact of the elongate tubular-shaped member with an arm of a user.

8. The football training device of claim 1, wherein the elongate tubular-shaped member further comprises a signal transmission apparatus configured to transmit a signal to a remote device upon contact of the elongate tubular-shaped member with an arm of the user.

9. A football training device for improving a ball takeaway of a quarterback to a loaded football ball position, the football training device comprising:
a wearable vest having a breast plate adjacent to a chest of the quarterback; and
a corrective member, each corrective member consisting essentially of an elongate tubular-shaped member having a proximal end releasably attached only to the breast plate of the vest so that the elongate tubular-shaped member extends substantially perpendicular from the c breast plate of the vest, wherein the elongate tubular-shaped member is configured to release from the breast plate upon contact of the elongate tubular-shaped member with an arm of a user during a throwing motion, wherein the elongate tubular-shaped member is positioned on the breast plate on a side of the breast plate that relates to the throwing hand of a user at a height on the breast plate that alerts the user of a low football takeaway from a neutral position to the loaded football ball position.

10. The football training device of claim 9, wherein the elongate tubular-shaped member has a substantially circular cross-section.

11. The football training device of claim 9, wherein the elongate tubular-shaped member has a substantially rectangular cross-section.

12. The football training device of claim 9, further comprising one or more breast plate hook and loop material(s) integrated with the breast plate of the vest, and corrective member hook and loop material integrated with the proximal end of the elongate tubular-shaped member, wherein the corrective member hook and loop material is releasably affixed to at least one of the one or more breast plate hook and loop material(s).

13. The football training device of claim 12, wherein the breast plate of the vest comprises multiple breast plate hook and loop materials, and wherein the elongate tubular-shaped member is repositionable on the breast plate hook and loop materials.

14. The football training device of claim 12, wherein the one or more breast plate hook and loop materials comprise an elongate substantially vertical strip of hook and loop material on a right half of the breast plate of the vest and an elongate substantially vertical strip of hook and loop material on a left half of the breast plate of the vest.

15. The football training device of claim 9, wherein the elongate tubular-shaped member further comprises at least one device configured to provide at least one of a visual and an audial alert upon contact of the elongate tubular-shaped member with an arm of the quarterback during a throwing motion.

16. A football training device for improving a ball takeaway of a quarterback to a loaded football ball position, the football training device comprising:
  a wearable vest having a breast plate adjacent to the chest of the quarterback; and
  at least one deformable corrective member having a proximal end and a distal end, wherein the proximal end of the at least one deformable corrective member is releasably attached only to the breast plate of the wearable vest, and the distal end of the at least one deformable corrective member extends perpendicularly away only from the breast plate of the wearable vest;
  wherein each deformable corrective member consists essentially of an elongate tubular-shaped member, wherein the elongate tubular-shaped member is positioned on the breast plate of the vest on a side of the breast plate that relates to the throwing hand of the quarterback at a height on the breast plate that alerts the quarterback of a low football takeaway for receiving contact with an arm of the quarterback during a quarterback football transition from the low football takeaway to the loaded football ball position.

17. The football training device of claim 1, wherein the elongate tubular-shaped member has a substantially circular cross-section.

18. The football training device of claim 1, wherein the elongate tubular-shaped member has a substantially rectangular cross-section.

19. The football training device of claim 1, comprising at least two deformable corrective members.

20. The football training device of claim 16, comprising at least two deformable corrective members.

* * * * *